Dec. 16, 1924.
J. G. FURLAN
METHOD OF MAKING LOCK SCREWS
Filed April 17, 1923      2 Sheets-Sheet 2
1,519,126
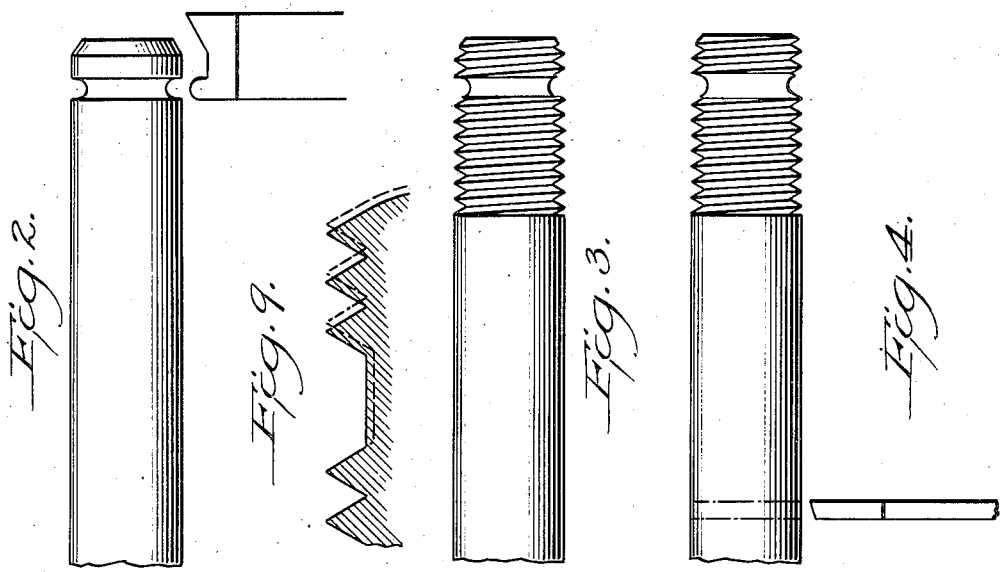
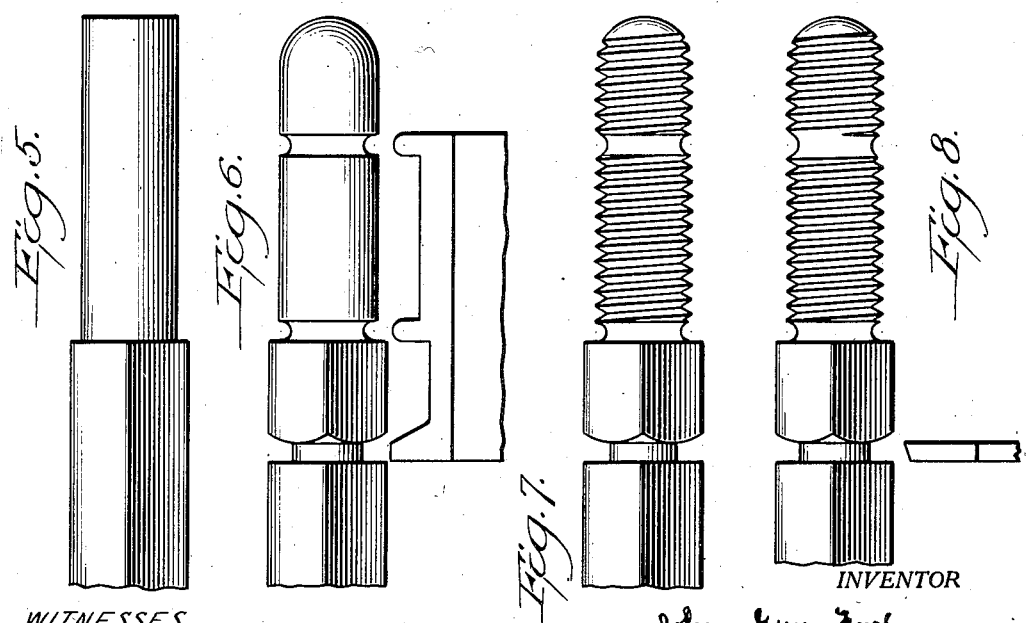
INVENTOR
John Guy Furlan
BY
Knight Bro.
ATTORNEYS
WITNESSES
Oliver W. Holmes Patented Dec. 16, 1924.

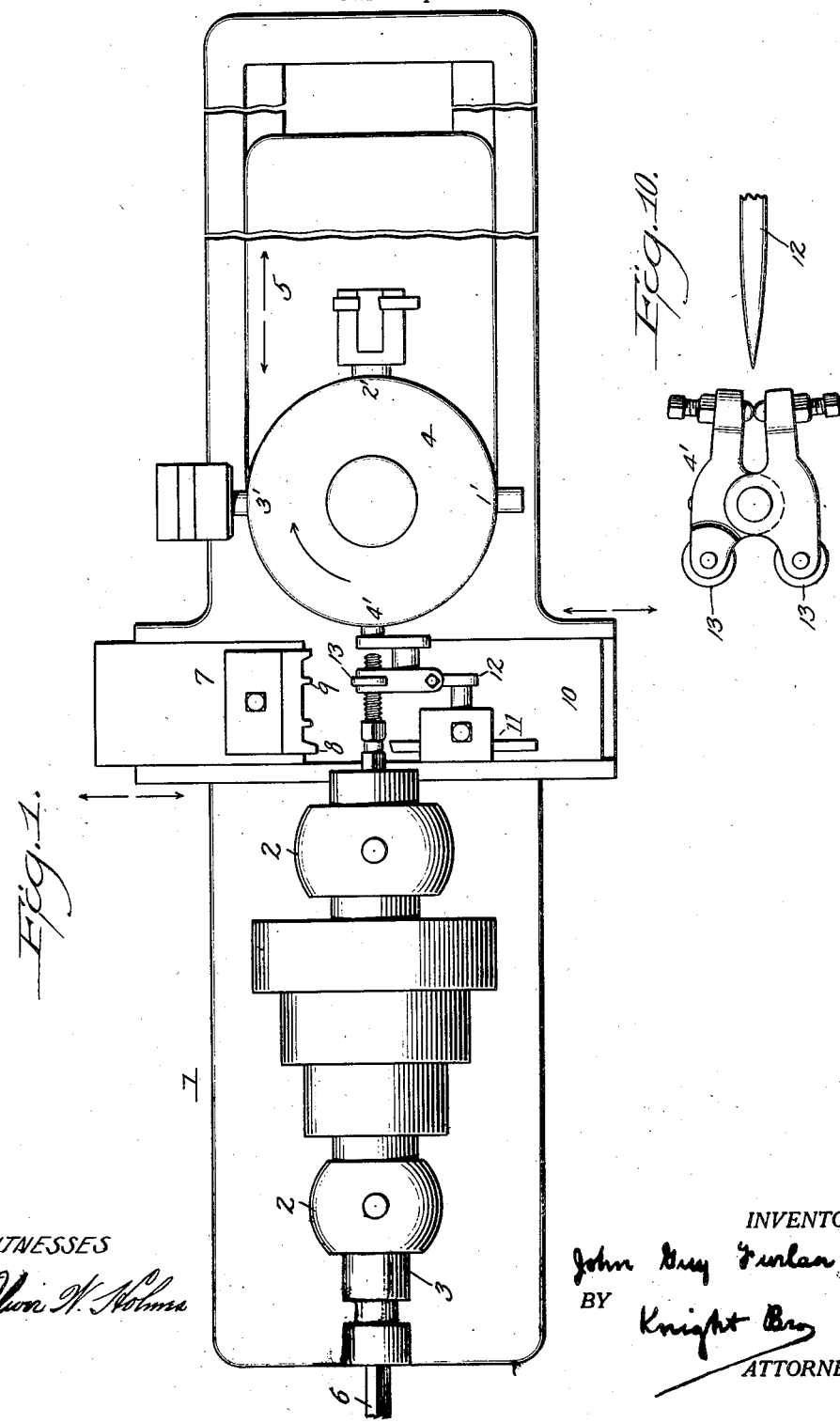

1,519,126

UNITED STATES PATENT OFFICE.

JOHN GUY FURLAN, OF NEW YORK, N. Y., ASSIGNOR TO FURLAN NUT MACHINERY CORPORATION, OF NEW YORK, N. Y., A CORPORATION OF NEW YORK.

METHOD OF MAKING LOCK SCREWS.

Application filed April 17, 1923. Serial No. 632,705.

*To all whom it may concern:*

Be it known that I, JOHN GUY FURLAN, a subject of the King of Italy, but having declared my intention of becoming a citizen of the United States, a resident of the city, county, and State of New York, have invented certain new and useful Improvements in the Methods of Making Lock Screws, of which the following is a specification.

My invention relates to a method whereby screw threaded rods such as studs, bolts, set screws and the like are given the characteristics of a lock nut, that is to say, a screw threaded member which when screwed into a threaded hole will have a tendency to become locked therein so that considerable force will be required to remove the same.

My invention comprises the steps of forming a circumferential groove in the screw intermediate to the threads and then expanding the metal at the base of the groove to throw out of helical alignments the threads on one or each side of the groove from those on the other side. A threaded member so formed will when screwed into a hole tapped with a standard thread possess an ideal locking characteristic, because the threads on one side of the groove will be pushing against the threads on the other side, thereby engendering a frictional resistance to turning that has been found to be an effective lock. The amount of extension of the necked portion must be so gaged as to insure that the metal at the neck will not be strained beyond its elastic limit when the screw is in use so that there will be no permanent set of the material. Another necessary precaution to be observed is the avoidance of any crowding of the side walls of the groove, as this would result in a distortion of the neighboring threads. The whole of the stretching or expanding must therefore be done with the metal at the base of the groove. When these precautions are observed such a screw may be used repeatedly without injuring the threads and without impairing its locking ability. Such a locking screw has all the advantageous features of a double check nut, for example, there is no bending of the shank, there is no mutilation of the threads, there is a uniform strain on all parts of all of the threads and the locking does not depend upon the position of the screw in the hole. It will lock in any position after the second course of threading has entered. The expansion of the metal may be accomplished in various ways, but the method which I prefer, and regard as a specific invention in itself, is one involving a cold rolling of the metal at the bottom of the groove by expanding tools, preferably rollers, brought to bear radially upon the bottom of the groove and forced inwardly while the screw is being rotated.

A further object of my invention is to accomplish this formation of the locking feature in the ordinary process of making such screws and comprises therefore the performance of the expanding operation within the time occupied by the usual operations of making the screw. Such screws are usually manufactured on a screw machine. Such a machine consists in general of a hollow spindle lathe equipped with a revolving turret or tool holder and a cross slide tool holder. The stock rod from which the screws are made is fed automatically thru the hollow spindle, being gripped by a chuck in the spindle and rotated thereby at the proper speed while the screw threaded member is being formed. During the forming of the member the tools of the turret and the cross slide are presented to the revolving rod in a sequential and cooperating manner to first shape the end of the bar then cut the thread and then cut off the finished screw.

During the performance of these operations and without occupying any additional time, I perform the operations of cutting a circumferential groove and then expanding the metal of the rod at the base of the groove. The groove may obviously be formed previous to or after the cutting of the thread but the expansion must only be after the threading is done as the object of the expansion is to displace in an axial direction the threads on one side of the groove from those on the other side.

For the better understanding of my improved method, reference may be had to the accompanying drawings, in which, Figure 1 is a plan view of a screw machine with a "set up" of tools adapted to carry out my method of making lock screws;

Figure 2 is a plan view of the end of a stock bar showing the completion of the first operation in the making of a locking stud bolt and a tool for accomplishing the same;

Figure 3 is a plan view showing the completion of the second operation which consists in cutting the thread;

Figure 4 shows the completion of the third operation which consists in expanding the metal at the bottom of the groove and cutting off the bolts from the bar;

Figure 5 is a plan view of the end of the stock bar showing the completion of the first operation of making a set screw;

Figure 6 is a similar view showing the completion of the second operation upon the set screw and a forming tool for accomplishing the same;

Figure 7 shows the same set screw with the thread cut thereon, this being the third operation;

Figure 8 shows the same set screw expanded in the groove and in process of being cut off, which completes the fourth and final operation;

Figure 9 shows a section thru the groove, the full lines and dotted lines showing the disposition of the metal before and after the stretching operation; and Figure 10 is a side view of the tool 4' shown in Figure 1.

Referring to Figure 1, the frame 1 of the screw machine has mounted thereon a head stock 2, carrying a hollow spindle 3 which is supplied with the ordinary automatic chuck. A horizontal turn table turret 4, which is automatically rotated step by step, in the direction of the arrow and is also automatically reciprocated longitudinally, as shown by the double arrow, on the table 5 carrying the same, has mounted thereon tools 1', 2', 3' and 4'. These tools perform respectively the operations of first bringing the stock bar 6 to rest at the proper point, second, forming the end of the bar, third, cutting the thread thereon and fourth, expanding the metal at the base of the groove. A cross slide 7 carries a forming tool for forming grooves in the bar 6 which is the customary groove which shapes the head of the bolt or screw and forms a preliminary operation to the cutting off of the screw, as shown at 8, while another part of the tool shown at 9 is for forming a groove which is subsequently to be expanded to give the locking feature to this groove. At 10 is shown another cross slide on the opposite side from the slide 7 and upon this cross slide is mounted a cutting off tool 11 and an expanding tool 12, the latter cooperating with the tool 4' for expanding the bolt at the groove.

In the manufacture of the screws there are three essential steps, namely, forming, threading and cutting off, and the object of my invention is to add the other operations of cutting an annular groove in the thread part or the part to be threaded and expanding the screw at the grooved part while and at the same time the fundamental operations are being performed, and by this I mean that I propose to make a screw that will have the added function of a locking screw without requiring any additional time. Thus in the case of the stud bolt shown in Figure 4, I combine the operation of cutting the groove with the operation of forming the end of the stud, then the thread is cut as usual, as shown in Figure 3 and finally while in process of being cut off as shown in Figure 4, I cause the wedge 12 to bring the expanding tool 4' into operation by forcing the expanding rolls 13 against the metal at the base of the groove whereby the metal at this point owing to the revolution of the rod 6 is cold rolled or expanded so as to shift the outlying threads of the screw from the full line position shown in Figure 9, to the dotted line position. The diameter of the groove is therefore necessarily slightly diminished, but as the cold rolling raises the elastic limit, this does not result in any weakening in the screw; but it must always be borne in mind that this cold rolling or swaging at the groove must be confined to the base of the groove, so that no injury shall come to the threads at either side thereof.

The box tool shown at 2' will be required only in cases where a turning operation is necessary as shown in Figure 5 in the first operation of forming a set screw out of a square bar. There may be other operations required in the formation of special kinds of screws or bolts, but these can be incorporated as additional steps without in any way interfering with the execution of my method which as above stated, has to do with the transforming of a screw into a lock screw while and at the same time that the ordinary steps of making this screw are being performed.

I claim:—

1. A method of making lock screws, which comprises the production of a screw having a circumferential groove intermediate properly aligned threads to either side thereof, and subsequently expanding the metal at the base of said groove to disalign the two groups of threads.

2. A method of making lock screws comprising the steps of first cutting a thread and forming a circumferential groove in the thread portion and second expanding the screw axially by compressing the metal at the base of the groove to set the threads on one side of the groove out of helical alignment with the threads on the other side of the groove.

3. A method of making lock screws comprising the steps of cutting a thread and forming a circumferential groove in the thread portion and then expanding the screw axially by compressing the metal at the base of the groove with a cold rolling operation to set the threads on one side of the groove out of helical alignment with the threads on the other side of the groove.

4. A method of making lock screws comprising the steps of first forming the screw with a groove dividing the threaded portion into two parts and then compressing the metal in the grooved part so as to elongate the screw.

5. A method of making lock screws on a screw machine from a stock bar, comprising the steps of forming the end of the screw and cutting a groove in the part to be threaded then threading the screw and finally expanding the screw by applying pressure to the base of the groove while cutting the screw off of the bar.

JOHN GUY FURLAN.